United States Patent
Lin et al.

(10) Patent No.: US 8,423,902 B2
(45) Date of Patent: Apr. 16, 2013

(54) REPRESENTATION OF OVERLAPPING VISUAL ENTITIES

(75) Inventors: Jeff J. Lin, Seattle, WA (US); Anne H. Loomis, Seattle, WA (US); Romualdo T. Impas, Seattle, WA (US); Alan Paulin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 12/764,798

(22) Filed: Apr. 21, 2010

(65) Prior Publication Data

US 2011/0265030 A1    Oct. 27, 2011

(51) Int. Cl.
   *G06F 3/048*   (2006.01)
(52) U.S. Cl.
   USPC ........................................ 715/790; 715/794
(58) Field of Classification Search ................. 715/790, 715/794, 846, 837
   See application file for complete search history.

(56) References Cited

U.S. PATENT DOCUMENTS

| | | | | |
|---|---|---|---|---|
| 5,553,209 | A * | 9/1996 | Johnson et al. | 345/667 |
| 5,787,422 | A | 7/1998 | Tukey et al. | |
| 5,790,121 | A | 8/1998 | Sklar et al. | |
| 6,204,844 | B1 | 3/2001 | Fumarolo et al. | |
| 7,076,741 | B2 * | 7/2006 | Miyaki | 715/837 |
| 7,603,327 | B2 | 10/2009 | Esfahany | |
| 7,668,649 | B2 * | 2/2010 | Onishi | 701/208 |
| 2002/0130906 | A1 | 9/2002 | Miyaki | |
| 2004/0243306 | A1 * | 12/2004 | Han | 701/211 |
| 2007/0268310 | A1 | 11/2007 | Dolph et al. | |
| 2008/0281869 | A1 | 11/2008 | Liu et al. | |
| 2009/0003657 | A1 | 1/2009 | Deardorff et al. | |
| 2009/0055774 | A1 * | 2/2009 | Joachim | 715/810 |
| 2009/0324035 | A1 | 12/2009 | Wengler et al. | |
| 2010/0023259 | A1 | 1/2010 | Krumm et al. | |
| 2010/0058212 | A1 * | 3/2010 | Belitz et al. | 715/766 |
| 2011/0010650 | A1 * | 1/2011 | Hess et al. | 715/765 |
| 2011/0047509 | A1 * | 2/2011 | Arrasvuori | 715/815 |
| 2011/0265023 | A1 | 10/2011 | Loomis | |

OTHER PUBLICATIONS

Wang, et al., "An E-map Navigation System with Visualized Landmark Information", Retrieved at << http://www.iaeng.org/publication/WCECS2008/WCECS2008_pp. 758-761.pdf >>, Proceedings of the World Congress on Engineering and Computer Science 2008, Oct. 22-24, 2008, pp. 4.

Cammarano, et al., "Visualization of Heterogeneous Data", Retrieved at << http://www.stanford.edu/~klingner/publications/Visualization_of_Heterogeneous_Data.pdf >>, IEEE Transactions on Visualization and Computer Graphics, vol. 13, No. 6, Nov. 2007, pp. 8.

(Continued)

*Primary Examiner* — Omar Abdul-Ali
(74) *Attorney, Agent, or Firm* — Wolfe-SBMC

(57) ABSTRACT

Various embodiments present a combined visual entity that represents overlapping visual entities. The combined visual entity can include a primary visualization that represents one of the overlapping visual entities and annotations that represent others of the overlapping visual entities. For example, a map view can include multiple geographical entities that overlap. A primary visualization can be rendered that represents one of the multiple geographical entities. The primary visualization can be visually annotated (e.g., with symbols, letters, or other visual indicators) to indicate others of the multiple geographical entities. In some embodiments, a zoom operation can cause visual entities to be added and/or removed from the combined visual entity.

20 Claims, 18 Drawing Sheets

OTHER PUBLICATIONS

Huffaker, et al., "Influence Maps—a Novel 2-D Visualization of Massive Geographically Distributed Data Sets", Retrieved at http://www.ipjforum.org/?p=53 >>, Internet Protocol Forum, Oct. 2008, pp. 1-6.

"Cluster Monitoring", Retrieved at << http://www.brightconnputing.com/Linux-Cluster-Monitoring.php >>, Retrieved Date: Feb. 20, 2010, pp. 3.

Stolte, et al., "Multiscale Visualization Using Data Cubes", Retrieved at << http://graphics.stanford.edu/papers/pan_zoom/paper.pdf >>, IEEE Transactions on Visualization and Computer Graphics, vol. 9, No. 2, Apr. 2003, pp. 8.

"Bing Tries to Leapfrog Google Maps—", Retrieved from <http://computernewsme.com/newsflashes/newsflash/bing-tries-to-leap-frog-google-maps.html> on Feb. 22, 2010, Computer News Middle East,(Dec. 2, 2009),2 pages.

"Clustering a Million Points on Virtual Earth using AJAX and .Net", Retrieved from: <http://soulsolutions.com.au/Articles/ClusteringVirtualEarthPart1.aspx> on Feb. 22, 2010, Soul Solutions,(Aug. 11, 2006),10 pages.

"Google Maps API", Retrieved from: <http://code.google.com/apis/maps/documentation/overlays.html> on Feb. 22, 2010, 18 pages.

"Pushpin™ LE API Documentation (Version 1.0)", Retrieved from: <http://www.pushpin.com/api/1.0/docs/index.html> on Feb. 22, 2010, (Apr. 3, 2006),16 pages.

"Visualization of Locations and Regions", Retrieved from: <http://base.thyssenkrupp.com/tkbase_internet/tkbase_internet_help/eng/Standortvisualisierung/Standortvisualisierung_internet.htm> on Feb. 22, 2020,5 pages.

Cammarano, Mike "Visualization of Heterogeneous Data", *IEEE Transactions on Visualization and Computer Graphics*, vol. 13, Issue 6, Available At <http://www.stanford.edu/~klingner/publications/Visualization_of_Heterogeneous_Data.pdf>,(Nov. 2007),8 pages.

Kinnan, Keith "Bing Maps Platform Team Blog", <Retrieved from: <http://blogs.msdn.com/veplatform/archive/2008/10/12/clustering-pushpins-with-the-virtual-earth-map-control-api.aspx> on Feb. 22, 2010, (Oct. 12, 2008),3 pages.

Turk, Reuben "Selecting Multiple Locations with a Single Google Map", Retrieved from: <Retrieved from: <http://agileware.net/blog/enhancing-drupals-gmap-google-maps-and-location-modules> on Feb. 22, 2010, (Jun. 9, 2009),7 pages.

"Non-Final Office Action", U.S. Appl. No. 12/764,688, (Aug. 2, 2012), 17 pages.

"Final Office Action", U.S. Appl. No. 12/764,688, (Jan. 9, 2013), 20 pages.

* cited by examiner

REPRESENTATION OF OVERLAPPING VISUAL ENTITIES

BACKGROUND

Due to the massive amount of data available for consumption in today's electronic environment, data visualization can be problematic. For example, a mapping application can have access to a multitude of locations (e.g., restaurants, banks, hotels, parks, and so on) that can be displayed as part of a map view. The sheer number of locations available for display, however, can cause a particular map view to become cluttered and reduce the usability of the map view.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments present a combined visual entity that represents overlapping visual entities. The combined visual entity can include a primary visualization that represents one of the overlapping visual entities and annotations that represent others of the overlapping visual entities. For example, a map view can include multiple geographical entities that overlap. A primary visualization can be rendered that represents one of the multiple geographical entities. The primary visualization can be visually annotated (e.g., with symbols, letters, or other visual indicators) to indicate others of the multiple geographical entities. In some embodiments, a zoom operation can cause visual entities to be added and/or removed from the combined visual entity.

In some embodiments, overlapping visual entities are grouped into a cluster that can be opened to reveal individual visual entities that form the cluster. According to one or more embodiments, a cluster is represented on a map by a visual representation known as a foundation. A user can interact with the foundation to cause the cluster to be opened to reveal a flyout that includes individual visual entities that form the cluster. In some embodiments, the visual entities can represent geographical locations in a map view. A user can also interact with an individual visual entity of the flyout to acquire more information about the visual entity.

BRIEF DESCRIPTION OF THE DRAWINGS

The same numbers are used throughout the drawings to reference like features.

DETAILED DESCRIPTION

Overview

Figure 1:
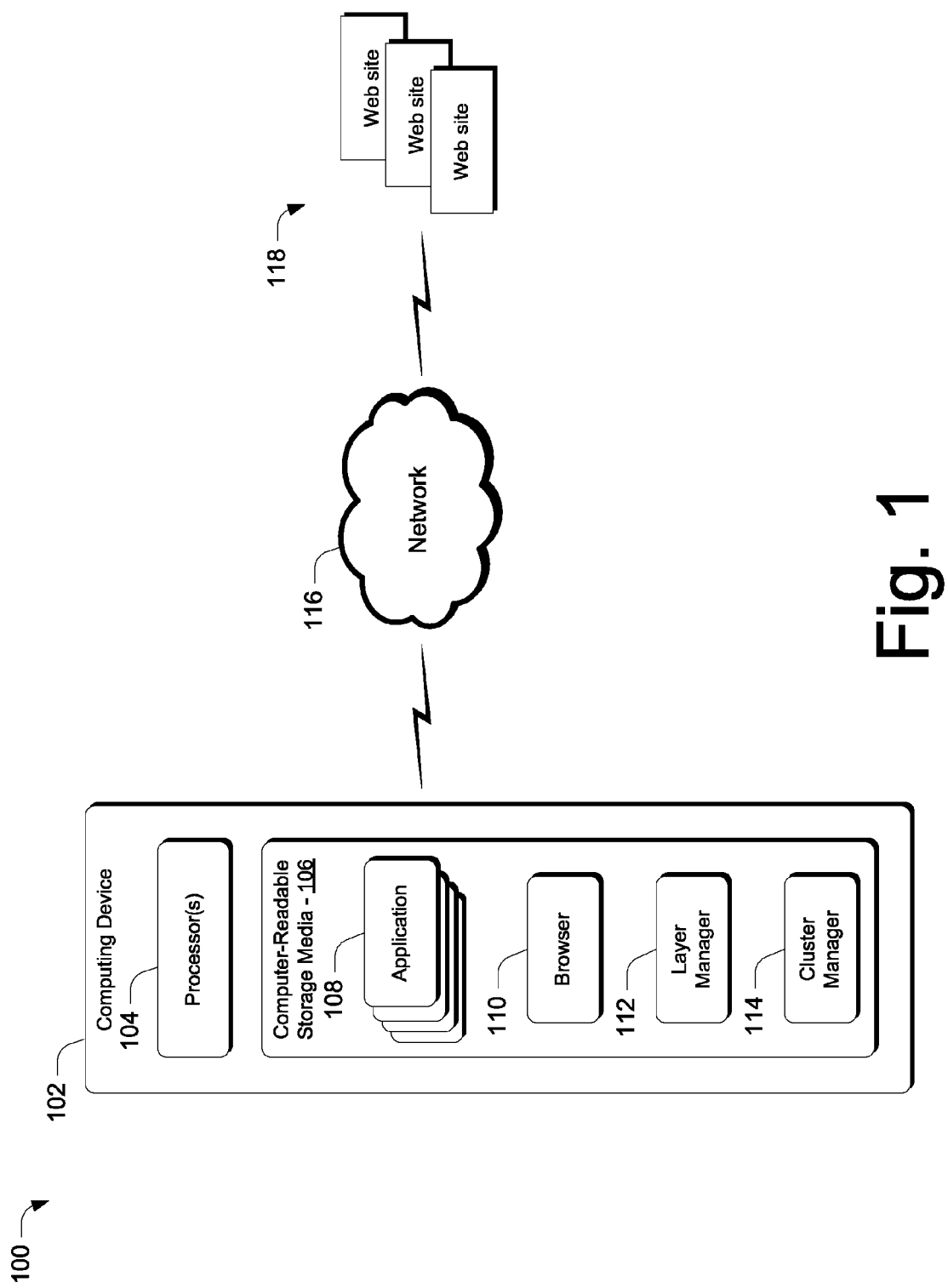
FIG. 1 illustrates an operating environment in which various principles described herein can be employed in accordance with one or more embodiments.

Various embodiments present a combined visual entity that represents overlapping visual entities. The combined visual entity can include a primary visualization that represents one of the overlapping visual entities and annotations that represent others of the overlapping visual entities. For example, a map view can include multiple geographical entities that overlap. A primary visualization can be rendered that represents one of the multiple geographical entities. The primary visualization can be visually annotated (e.g., with symbols, letters, or other visual indicators) to indicate others of the multiple geographical entities. In some embodiments, a zoom operation can cause visual entities to be added and/or removed from the combined visual entity.

In some embodiments, overlapping visual entities are grouped into a cluster that can be opened to reveal the individual visual entities that form the cluster. A visual entity can represent a data entity, such as a geographical location, a business, a residence, an instance of content, a data file, and so on. In some example operating scenarios, overlapping visual entities can represent geographical locations on a map that are combined to form a cluster, and the cluster can be opened to reveal the individual geographical locations that form the cluster. In at least some embodiments, the cluster can be opened independent of a zoom operation. According to one or more embodiments, a cluster is represented on a map by a visual representation known as a foundation. A user can interact with the foundation to cause the cluster to be opened to reveal a flyout that includes individual visual entities (e.g., geographic locations) that form the cluster. A user can also interact with an individual entity of the flyout to acquire more information about the entity. In at least some embodiments, user interaction can include hovering operations, proximity operations (e.g., user interaction within a certain proximity of a foundation or other entity), clicking operations, keyboard selection operations, touch operations, and the like.

In the discussion that follows, a section entitled "Operating Environment" is provided and describes one example environment in which one or more embodiments can be employed. Following this, a section entitled "Example Cluster Visualizations" describes how clusters of entities can be visualized in accordance with one or more embodiments. Next, a section entitled "Constructing and Interacting with Clusters" describes how a cluster can be formed and how a visualization of a cluster can be interacted with in accordance with one or more embodiments. Following this, a section entitled "Representation of Overlapping Visual Entities" describes how a combined visualization can be used to visually indicate overlapping data sets in accordance with one or more embodiments. Last, a section entitled "Example System" describes an example system that can be utilized to implement one or more embodiments.

Consider now an example operating environment in which one or more embodiments can be implemented.

Operating Environment

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 18.

In addition, computing device 102 includes a software application in the form of a web browser 110. Any suitable web browser can be used examples of which are available from the assignee of this document and others. In addition, computer-readable storage media 106 can include a layer manager 112 and a cluster manager 114 that are configured to operate as described below. Each of layer manager 112 and cluster manager 114 can be implemented as a standalone component that can be utilized by applications 108 and/or browser 110. Alternately or additionally, layer manager 112 and/or cluster manager 114 can be implemented as part of applications 108 and/or browser 110. Examples of Applications 108 can include a mapping platform (e.g., utilizing 2D and/or 3D maps), an operating system, a file explorer, and so on.

In operation, layer manager 112 handles layers of data for the applications 108. For example, a mapping application can include multiple layers of map data that can be used to populate a map view. Each of the multiple layers can include different types of entities and map data. For example, a first layer may include restaurants, a second layer may include educational institutions, a third layer may include locations defined by an end-user, and so on. In some embodiments, multiple layers can be overlaid, one on another, to create a particular map view. To manage layer data, layer manager 112 is configured to handle a variety of different tasks, such as tracking a location for a visual entity, maintaining different visual forms for a visual entity, managing the z-order (e.g., layer order) of different layers and/or visual entities, and so on.

In at least some embodiments, cluster manager 114 works in a mapping context to enable various visual entities to be grouped into a cluster. A visual entity can represent a data entity, such as a geographical location, an instance of media content, a data file, and the like. The cluster manager can group visual entities into a cluster by determining overlap between visual entities in a particular display region. When a particular group of visual entities overlap by at least a threshold amount, the group of visual entities can be formed into a cluster. Overlap can be measured using a variety of different metrics, such as screen pixels, world-coordinates (e.g., GPS coordinates, latitude, longitude, and so on), street addresses, and so on. Example ways of determining overlap are discussed below.

According to some embodiments, layer manager 112 and cluster manager 114 are configured to interact and communicate to group visual entities into clusters and to place visual entities and clusters in a particular display view. Layer manager 112 can provide cluster manager 114 with different types of information that can be used by the cluster manager to create and manage clusters. Examples of this information include:

Entity list: This is a list of visual entities and/or data entities in a particular system. For example, in a map scenario, this can include a list of geographic entities and visual representations of the geographic entities that are available to populate a map.

Visible entities: This is a list of the visual entities that are in a current view. For example, this may include geographical entities that are represented in a current map view.

Existing clusters: This is a list of clusters that are currently in existence.

Visual entities: This includes a location and dimension for each visual entity. For example, this information may include a location (e.g., in screen coordinates) and a dimension (e.g., in pixels relative to the screen coordinates) of a visual entity.

Z-order: This includes a z-order for visual entities, clusters, and/or layers in a particular system. For example, a particular visual entity can have a z-order that indicates that the entity is to be displayed above (e.g., occlude) other visual entities in a display view.

Entity status: This indicates changes in entity status for a particular render pass. For example, this information can indicate that an entity was added, removed, or changed z-order for a particular render pass. In some embodiments, the term "render pass" refers to a re-draw of entities in a display view. A render pass can occur responsive to changes in a display view, such as a zoom operation, the addition or removal of entities, a change in cluster membership, and so on.

Layer Membership: This indicates which entities belong to which layer and an order for each of the layers in a layer set.

In some embodiments, cluster manager 114 can receive some or all of this information from layer manager 112, process the information, and generate further information that can be passed back to the layer manager to populate a particular display view. Examples of this further information can include:

(1) Updated entity list: This can include an updated list of entities (including cluster entities) and a list of entities that were removed from existing clusters.

(2) Entity layers: This can include a list of layers that include entities included in clusters.

(3) Cluster membership: This can include an indication of a cluster membership for an entity.

(4) Entity change: This can include an indication of visual entities and/or clusters that should be added or removed from a display view.

(5) Cluster z-order: This can include a z-order for entities in a particular cluster.

(6) Visual elements: This can include a visual representation to be used to represent a cluster. In some embodiments, each of multiple clusters can be associated with a unique visual representation.

In addition the above-mentioned features, environment 100 includes a network 116, such as the Internet, and one or more web sites 118 from and to which content can be received and sent. Such content can include map content that can be operated upon by layer manager 112 and/or cluster manager 114, as described above and below. It is to be appreciated and understood that the layer manager and/or the cluster manager can reside on a server or network-accessible computer, other than computing device 102.

Computing device 102 can be embodied as any suitable computing device such as, by way of example and not limitation, a desktop computer, a portable computer, a handheld computer such as a personal digital assistant (PDA), cell phone, a mobile device, and the like.

Although not expressly illustrated in FIG. 1, environment 100 can include a plug-in framework (e.g., embodied on computing device 102) that enables developers, programmers, and other parties to utilize the techniques and processes discussed herein in separate implementations.

Having described an example operating environment, consider now a discussion of example clusters in accordance with one or more embodiments.

Example Cluster Visualizations

Figure 2:
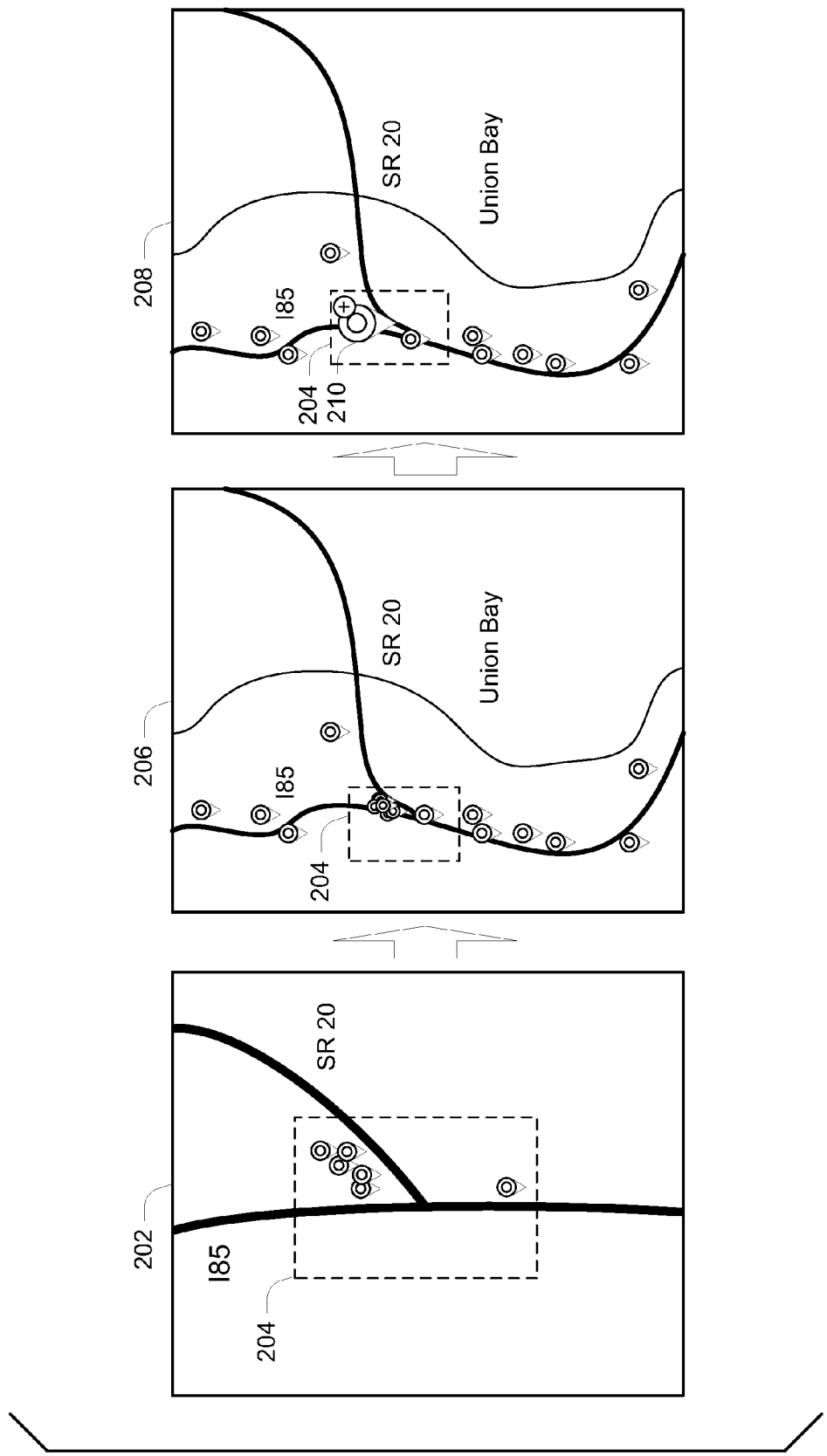
FIG. 2 illustrates how a cluster of visual entities can be visualized in accordance with one or more embodiments.

FIG. 2 illustrates one example way in which multiple overlapping visual entities can be visualized as a cluster in a mapping context in accordance with one or more embodiments. A map view 202 displays a group of visual entities and includes a map region 204. A map view 206 illustrates a map view that is displayed after a zoom-out operation occurs on map view 202. The map view 206 includes map region 204 as well as additional visual entities. As illustrated in map view 206, the increase in the map scale resulting from the zoom-out operation has caused visual entities within map region 204 to be grouped together such that some visual entities visually occlude other visual entities.

Further illustrated in FIG. 2 is a map view 208 that includes map region 204 and a foundation 210. In accordance with some embodiments, foundation 210 is a visual representation of a cluster that is created using visual entities from map region 204. Thus, the overlapping group of visual entities displayed in map region 204 of map view 206 can be replaced with foundation 210. Foundation 210 can represent a unified visual representation that a user can interact with to view visual entities included in the cluster and to find out more information about the visual entities.

In some embodiments, a visualization for a foundation can be defined for an application by an application developer and/or the visualization can be selected by an end-user. Thus, at least in some embodiments, a visualization for a foundation is customizable to provide a unique visual appearance for a cluster.

Figure 3:
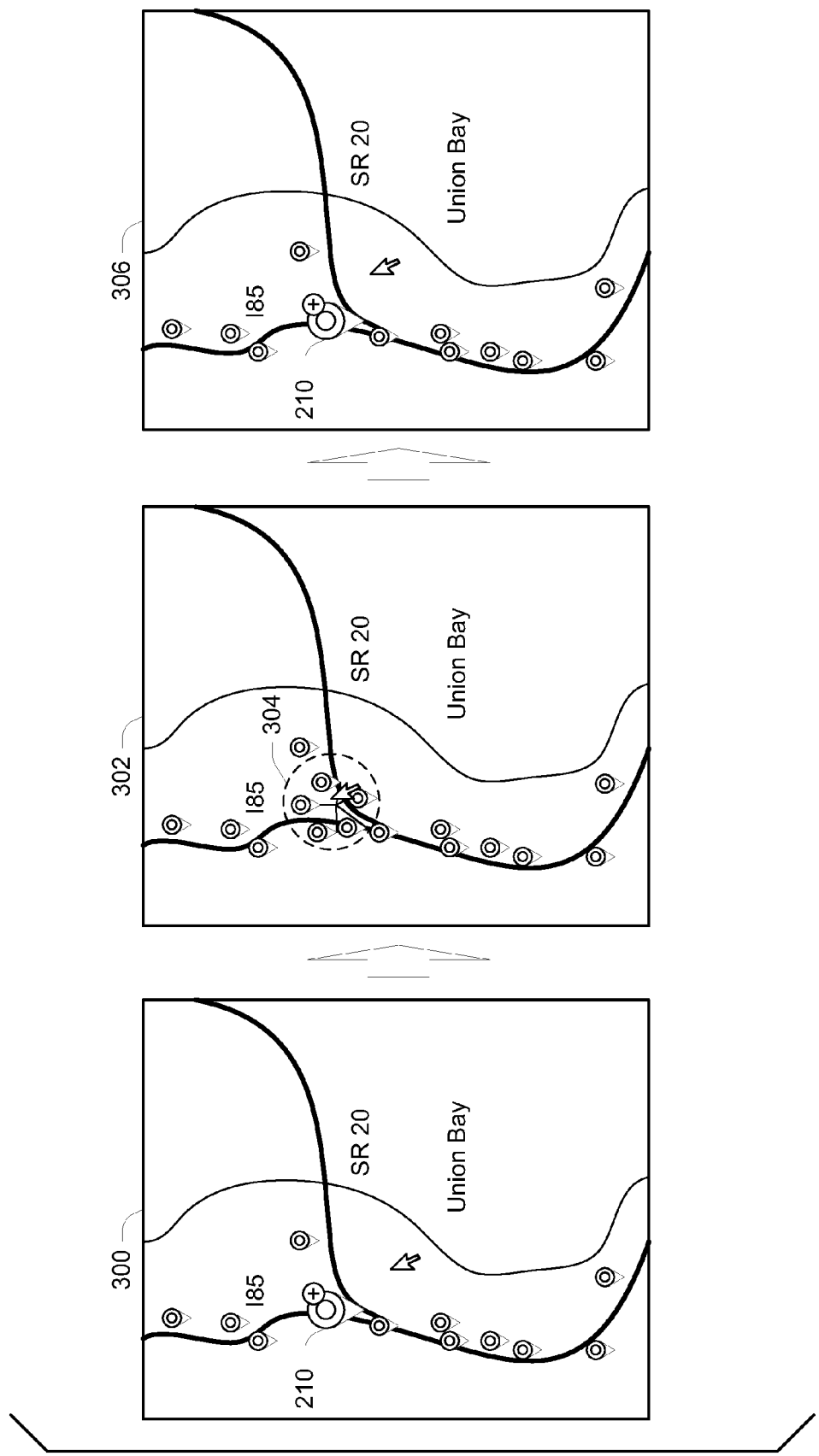
FIG. 3 illustrates how a foundation can be expanded to reveal a flyout in accordance with one or more embodiments.

FIG. 3 illustrates one example way in which user interaction with a foundation can reveal visual entities that form a cluster in accordance with one or more embodiments. A map view 300 includes the foundation 210 discussed above with reference to FIG. 2. At a map view 302, a user has placed a cursor over the foundation 210 (e.g., by manipulating the cursor with a mouse), which has caused a flyout 304 to replace foundation 210. Flyout 304 includes visual entities that form the cluster represented by foundation 210. As illustrated, the visual entities are tied together as part of flyout 304 by graphic lines, indicating that the visual entities represent clustered entities and that the visual entities may not be displayed at a correct location for an underlying data entity.

In some embodiments, a visualization for a flyout can be defined for an application by an application developer and/or the visualization can be selected by an end-user. Thus, at least in some embodiments, a flyout visualization is customizable to provide a unique visual appearance for visual entities in a cluster.

At a map view 306, the user has moved the cursor away from flyout 304, thus causing flyout 304 to be replaced with foundation 210. Thus, in some embodiments, foundation 210 and flyout 304 have a dynamic relationship that responds to user interaction with the foundation and/or the flyout.

Figure 4:
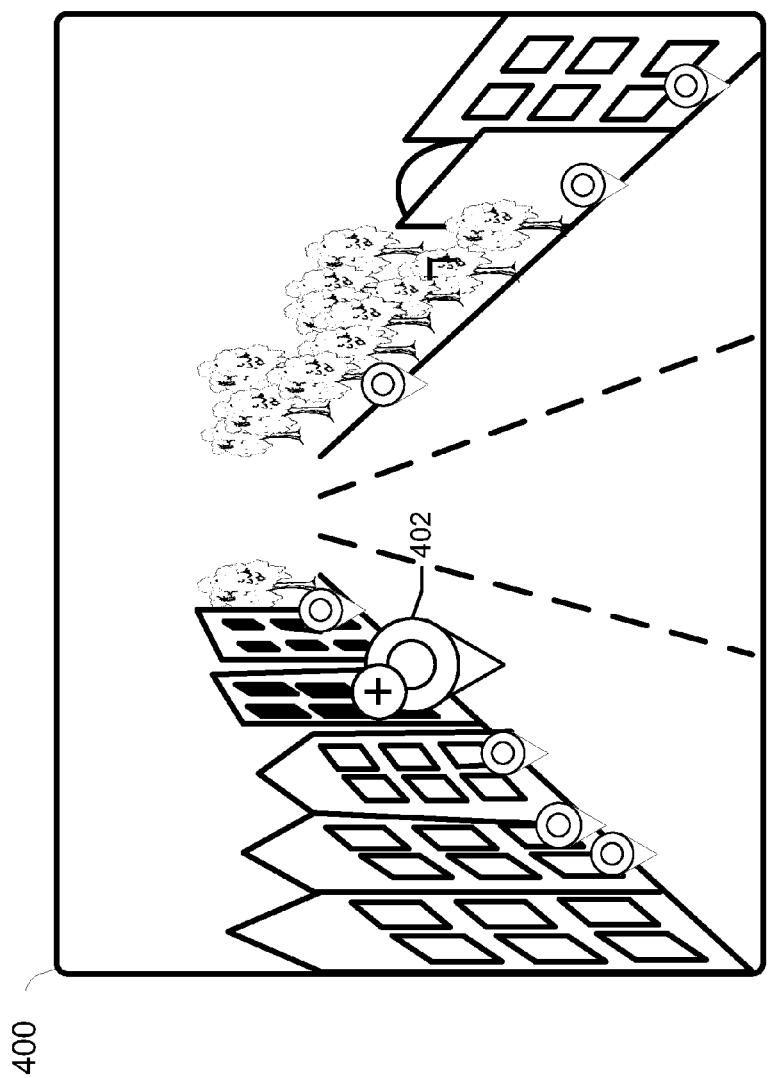
FIG. 4 illustrates how a foundation can be used to illustrate a cluster in a street view scenario in accordance with one or more embodiments.

FIG. 4 illustrates one example way of using a foundation to represent a cluster in a street view paradigm in accordance with one or more embodiments. As part of FIG. 4 are a street view 400 and a foundation 402. In some embodiments, street view 400 is a two-dimensional approximation of a three-dimensional view. For example, street view 400 can approximate the view of a person who is traveling (e.g., walking or driving) along a street. In the street view context, some visual entities can occlude other visual entities. For example, if several visual entities are located at the same address (e.g., in an office building), the visual entities can become cluttered and some of the visual entities can partially or totally occlude others. Thus, a foundation/flyout combination (represented by foundation 402) can be used to represent a cluster of visual entities at a particular location in street view 400.

In some embodiments, the design of a foundation and/or flyout can be configured to convey meaning in a particular context. For example, a visualization for a foundation can include a building at a particular location and an associated flyout can include a map of different locations within the building.

Figure 5:
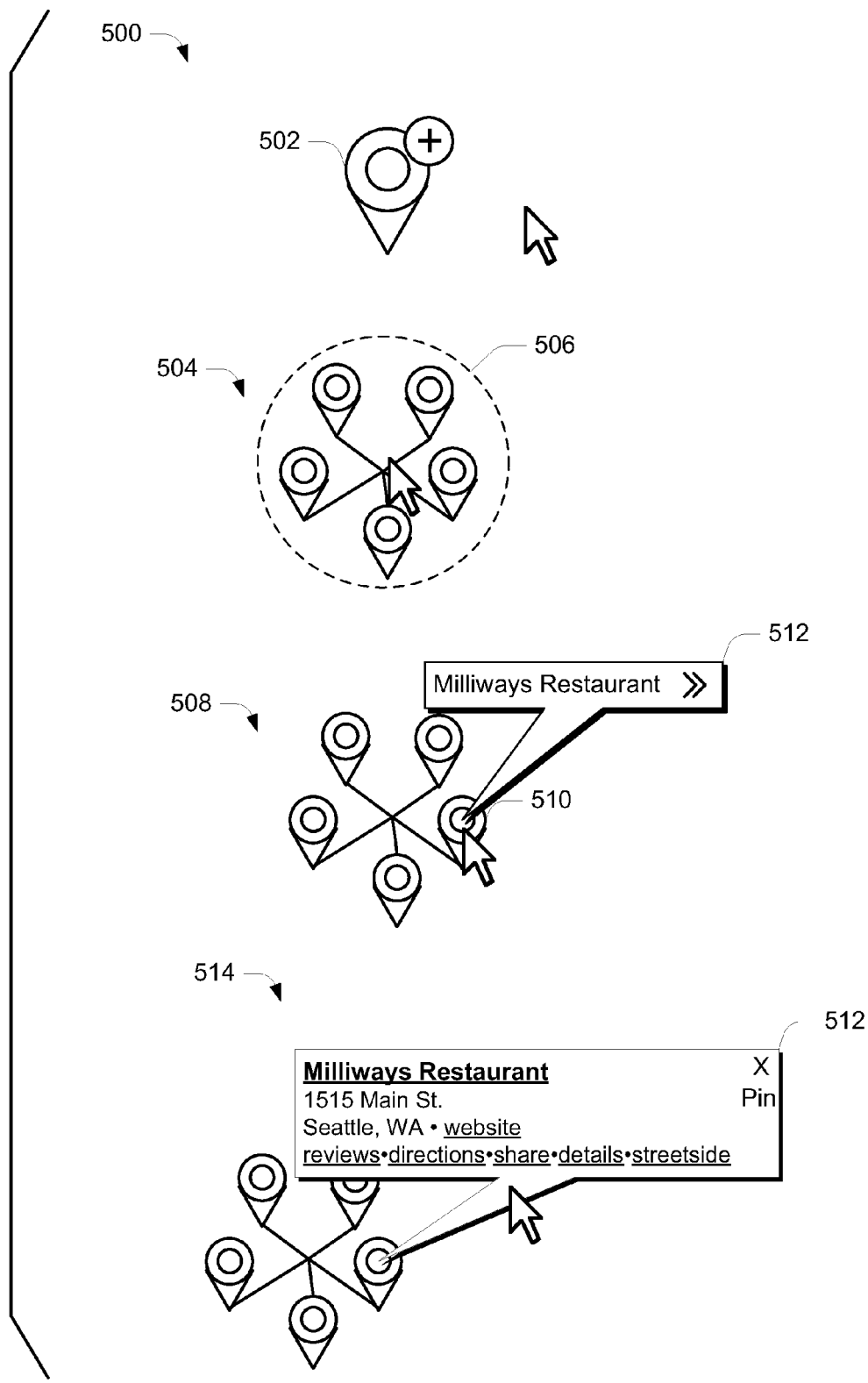
FIG. 5 illustrates how interaction with a flyout can cause information about a flyout entity to be presented in accordance with one or more embodiments.

FIG. 5 illustrates one example way of interacting with a foundation to view visual entities in a cluster in accordance with one or more embodiments. At 500, a foundation 502 is illustrated. As discussed above and below, in some embodiments a foundation is a visual representation of clustered entities. At 504, user interaction with foundation 502 causes an underlying cluster to open and reveal a flyout 506. At 508, user interaction with a visual entity 510 reveals information about visual entity 510. In this particular example, the information is included in a popup window 512.

At 514, user interaction with the popup window 512 causes the popup window to expand and reveal further information about the visual entity 510. In this particular example embodiment, the further information includes selectable links that can be selected to navigate to functionality associated with the represented entity.

Figure 6:
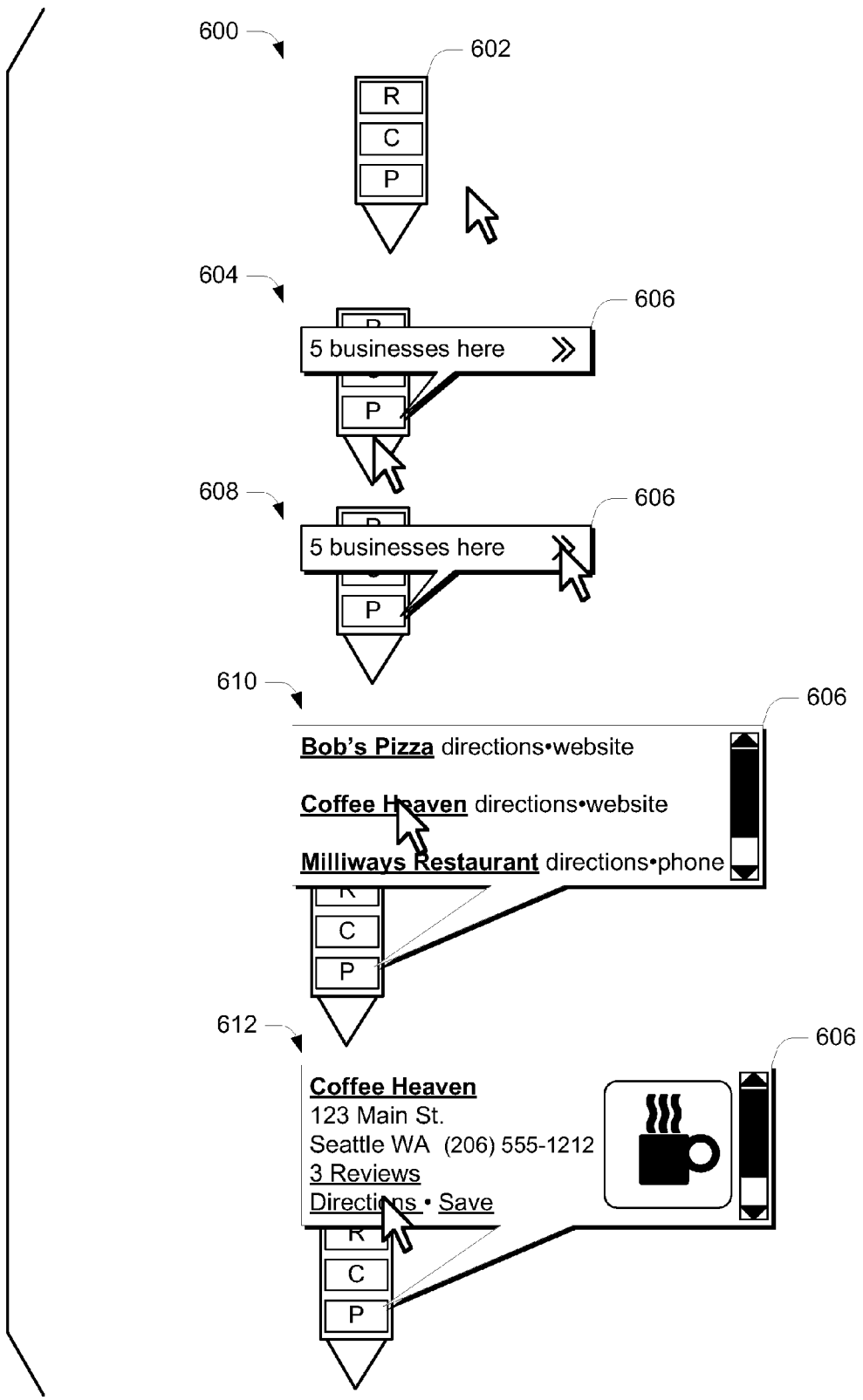
FIG. 6 illustrates how interaction with a flyout can cause information about a flyout entity to be presented in accordance with one or more embodiments.

FIG. 6 illustrates an alternative embodiment of a foundation/flyout combination in accordance with one or more embodiments. At 600, a foundation 602 is displayed that represents a cluster of visual entities. In this particular example embodiment, foundation 602 is annotated to indicate aspects of one or more of the visual entities of the underlying cluster. For example, foundation 602 includes an "R" which indicates that one of the entities is a restaurant, a "C" which indicates that one of the entities is a coffee shop, and a "P" which indicates that one of the entities is associated with parking At 604, user interaction with foundation 602 causes a popup window 606 to be displayed. At 608, a user interacts with the popup window 606. According to some embodiments, user interaction with popup window 606 can include causing a cursor to hover over the popup window. At 610, the user interaction with popup window 606 causes the popup window to expand to reveal more information about visual entities included in the cluster represented by foundation 602. In this particular example embodiment, the information includes a scrollable list of business entities that are part of the cluster. At 612, user interaction with one of the listed business entities causes popup window 606 to be populated with more information about the business entity.

Constructing and Interacting with Clusters

Figure 7:
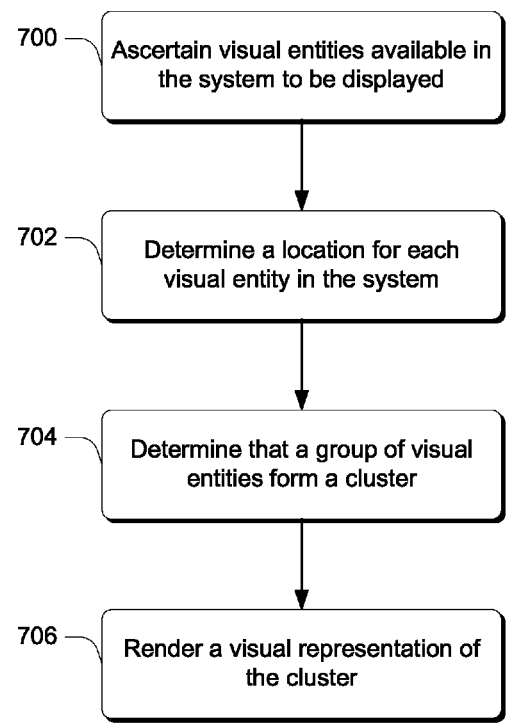
FIG. 7 is a flow diagram that describes steps in a method in accordance with one or more embodiments.

FIG. 7 is a flow diagram that describes steps in a method in accordance with one or more embodiments. The method discussed with reference to FIG. 7, in addition to any other of the methods discussed herein, can be implemented in connection with any suitable hardware, software, firmware or combination thereof. In at least some embodiments, aspects of the methods discussed herein can be implemented by software modules, such as layer manager 112 and/or cluster manager 114 discussed in FIG. 1. It is to be appreciated and understood that the methods discussed herein can be performed by a suitably-configured server, a network-accessible computing device, and/or a client computing device.

Step 700 ascertains visual entities that are available in the system to be displayed. For example, in a mapping scenario, the visual entities can represent geographical locations that can occur in a particular map view. The visual entities can be stored at a local resource (e.g., computing device 102) and/or available from a remote resource. Step 702 determines a location for each visual entity in the system. In some embodiments, the location may be in terms of screen location (e.g., screen coordinates), real-world location (e.g., GPS coordinates, street address, latitude/longitude coordinates, and so on), computer directory location, and so on. Step 704 determines that a group of visual entities forms a cluster. Example ways of performing step 704 are discussed in more detail below. Step 706 renders a visual representation of the cluster. Example visual representations of a cluster are discussed above (e.g., a foundation) and below.

According to some embodiments, a data entity can opt in or opt out of the clustering process. For example, when a particular data entity opts into the clustering process, a visual entity that represents the data entity will be considered when determining clusters. When a particular data entity opts out of the clustering process, however, a visual entity that represents the data entity will be omitted when determining clusters.

As an illustration of this notion, consider the following example implementation scenario involving a tourist attraction data entity. When the tourist attraction registers with a particular data layer (e.g., to be included in a map), the tourist attraction provides an indication that it is opting out of the clustering process. When the clustering process is performed for a map region where the tourist attraction occurs, the tourist attraction is not considered in forming a cluster. Thus, according to some embodiments, the clustering process would normally group a visual representation of the tourist attraction with other visual entities to form a cluster. Since the tourist attraction has opted out of the clustering process, however, a visual representation of tourist attraction is not included as part of a cluster, e.g., as part of a foundation. Thus, in some embodiments, a visual representation of the tourist attraction can be rendered separately from an adjacent foundation.

Figure 8:
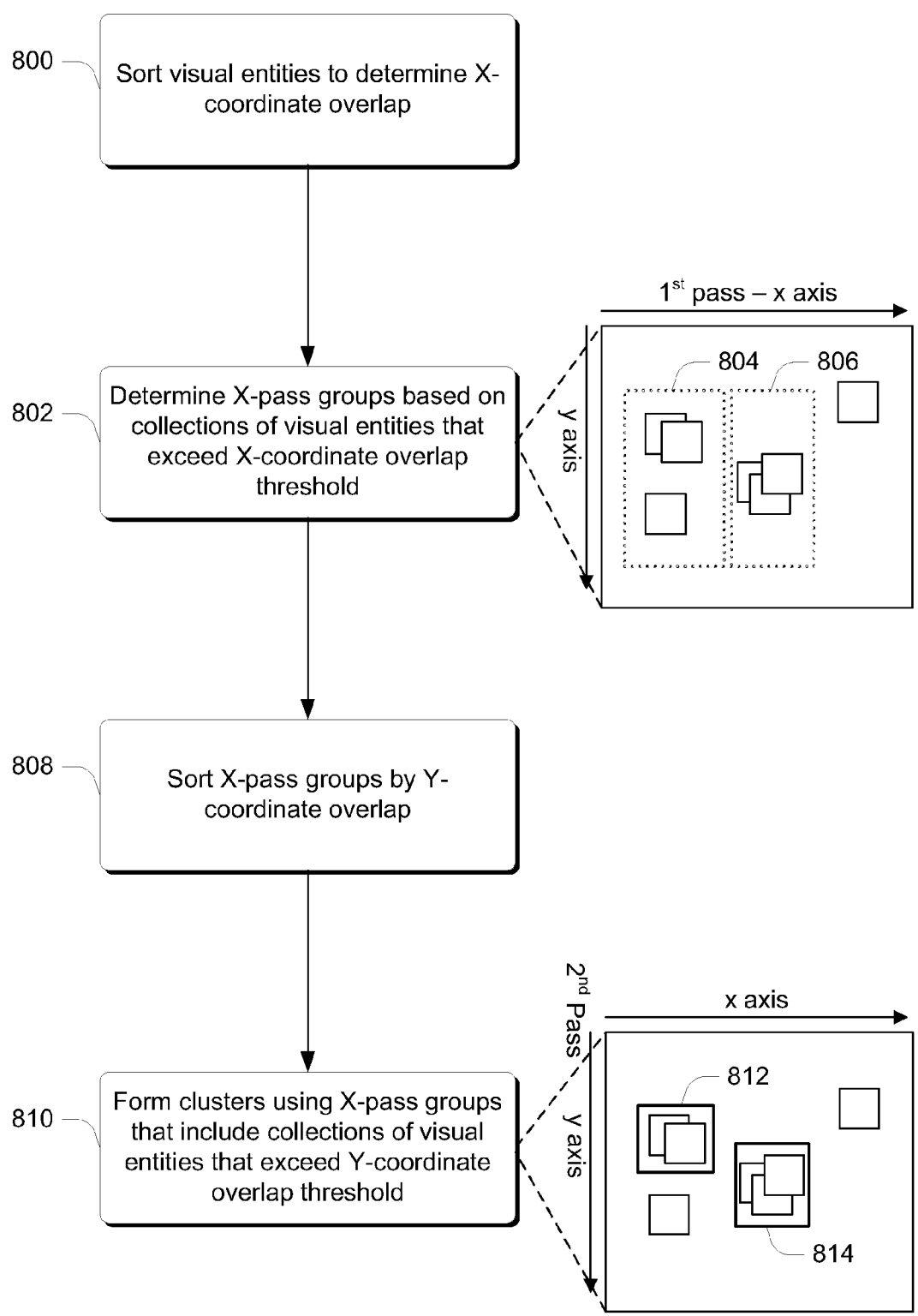
FIG. 8 is a flow diagram that describes steps in a method in accordance with one or more embodiments.

FIG. 8 is a flow diagram that describes steps in a method in accordance with one or more embodiments. In some embodiments, the method can be implemented to form a cluster that includes multiple visual entities. Step 800 sorts visual entities to determine x-coordinate overlap. In some embodiments, a configurable x-coordinate threshold overlap can be specified that can be used to determine if two or more visual entities overlap such that they can be members of a cluster. For example, with respect to x-coordinate overlap, a threshold overlap of N pixels can be specified. When two or more visual entities overlap by N pixels or more as projected on an x-axis, the visual entities can be considered an x-pass group for purposes of a preliminary cluster determination. In some embodiments, the acts of sorting discussed above and below can be accomplished in linear time using a linear sort algorithm (e.g., Radix sort).

Step 802 determines x-pass groups based on collections of visual entities that exceed an x-coordinate overlap threshold. As illustrated in the projection from step 802, the entities within box 804 and box 806 exceed an x-pass overlap threshold and thus are grouped as x-pass groups. Step 808 sorts the x-pass groups by y-coordinate overlap.

Step 810 forms clusters using x-pass groups that include collections of visual entities that exceed a y-coordinate overlap threshold. A configurable threshold y-coordinate overlap can be specified or the threshold x-coordinate overlap discussed above can be utilized in sorting the x-pass groups by y-coordinate overlap. As illustrated in the projection from step 810, a cluster 812 and a cluster 814 have been formed as a result of step 810.

In some embodiments, a maximum number of visual entities permitted in a cluster can be specified. For example, a maximum of 5 visual entities per cluster can be specified. If a cluster exceeds the maximum number of visual entities, the cluster can be broken up into separate clusters and/or visual entities can be removed from the cluster until it reaches the maximum size. Although not expressly illustrated in FIG. 8, a final step can be performed whereby clusters that exceed a maximum number of visual entities can be broken up into multiple clusters (e.g., two or more smaller clusters) and/or visual entities can be removed from a cluster that exceeds a maximum number of visual entities. In some embodiments, visual entities that are removed from a cluster can be displayed separately from a foundation.

Figure 9:
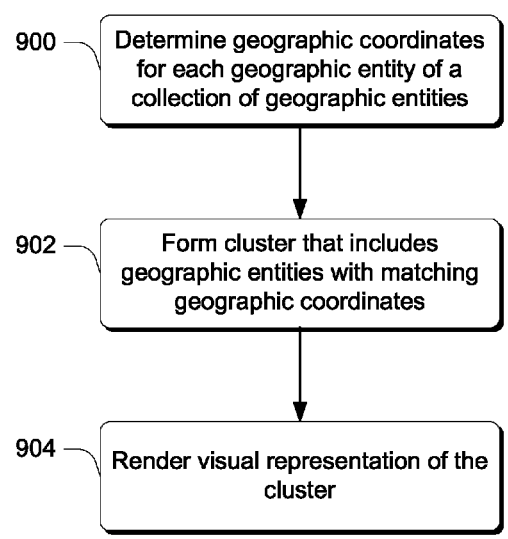
FIG. 9 is a flow diagram that describes steps in a method in accordance with one or more embodiments.

FIG. 9 is a flow diagram that describes steps in a method in accordance with one or more embodiments. In some embodiments, the method can be implemented to form a cluster that includes multiple geographic entities. Examples of geographic entities include street addresses, businesses, residential locations, and so on. Step 900 determines geographic coordinates for each geographic entity of a collection of geographic entities. Examples of geographic coordinates include latitude coordinates, longitude coordinates, GPS coordinates, and so on. Step 902 forms a cluster that includes geographic entities with matching geographic coordinates. One example way of performing step 902 is to compute a hash value using geographical coordinates for each geographic entity. For example, a one-pass linear bucketing of the geographical coordinates can be performed. Geographic entities with identical and/or similar hash values are then grouped together to form a cluster.

Step 904 renders a visual representation of the cluster. According to some embodiments, this method of forming clusters can be useful in a street view scenario (see, e.g., the discussion above with respect to FIG. 4) to form clusters using geographical entities that occur at the same or similar location (e.g., a particular street address).

The methods discussed herein for determining entity overlap and/or forming clusters are provided for purposes of example only and are not to be interpreted as limiting the claimed subject matter. It is to be appreciated that a variety of different methods and techniques can be utilized to form clusters without departing from the spirit and scope of the claimed embodiments. For example, some techniques can simply look at pixel occlusion, some can consider the shape of entities in forming a cluster (e.g., utilizing a shape collision detection algorithm), and so on.

While certain embodiments are discussed herein with respect to forming clusters based on entity overlap, some embodiments can additionally or alternatively form clusters utilizing entities that are like or similar in nature. For example, some clustering techniques can form clusters using similar entities, such as a restaurant cluster, a tourist attraction cluster, a coffee shop cluster, and so on. Thus, in some embodiments, a cluster-forming technique can consider the proximity and/or overlap of entities and can also consider the nature of each of the entities. For example, if two entities are of disparate types (e.g., one is a restaurant and the other is a sporting goods store), the two entities may not be included in the same cluster.

Figure 10:
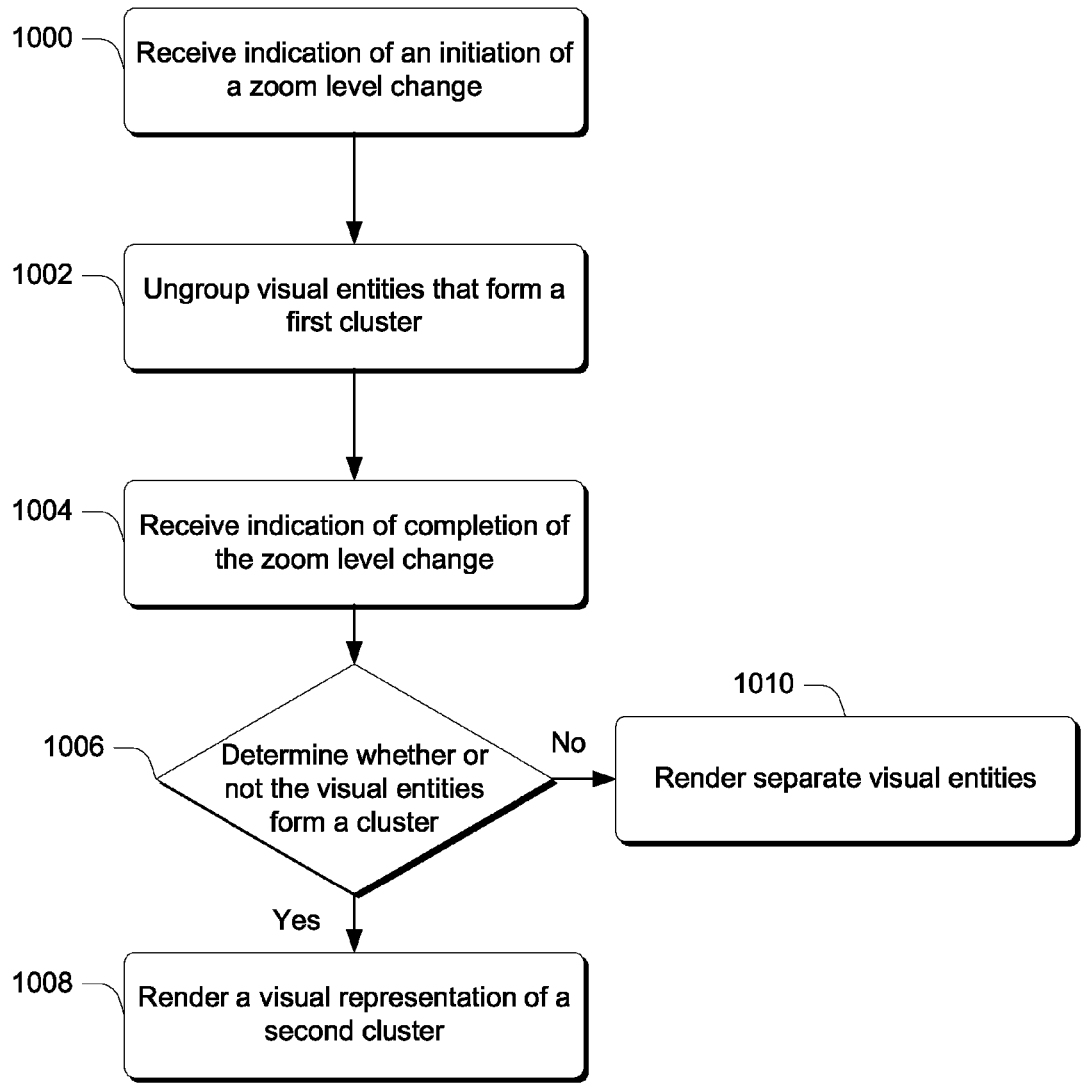
FIG. 10 is a flow diagram that describes steps in a method in accordance with one or more embodiments.

FIG. 10 is a flow diagram that describes steps in a method in accordance with one or more embodiments. In some embodiments, the method can be implemented to cluster and/or de-cluster entities in response to a zoom operation. Step 1000 receives an indication of an initiation of a zoom level change. According to some embodiments, step 1000 can be performed responsive to user interaction with a zoom (e.g., zoom-in or zoom-out) function. Step 1002 ungroups visual entities that form a first cluster. In some embodiments, the first cluster can be ungrouped responsive to receiving the indication of the zoom level change. Step 1004 receives an indication of completion of the zoom level change. In some embodiments, the zoom level change can include a zoom-in and/or a zoom-out operation.

Step 1006 determines whether or not the visual entities form a cluster. Example ways of determining that visual entities form a cluster are discussed above and below. If the visual entities form a cluster ("Yes"), step 1008 renders a visual representation of a second cluster. In some embodiments, the second cluster may include the same visual entities as the first cluster, fewer visual entities than the first cluster, or more visual entities than the first cluster. If the visual entities do not form a cluster ("No"), step 1010 renders separate visual entities.

Figure 11:
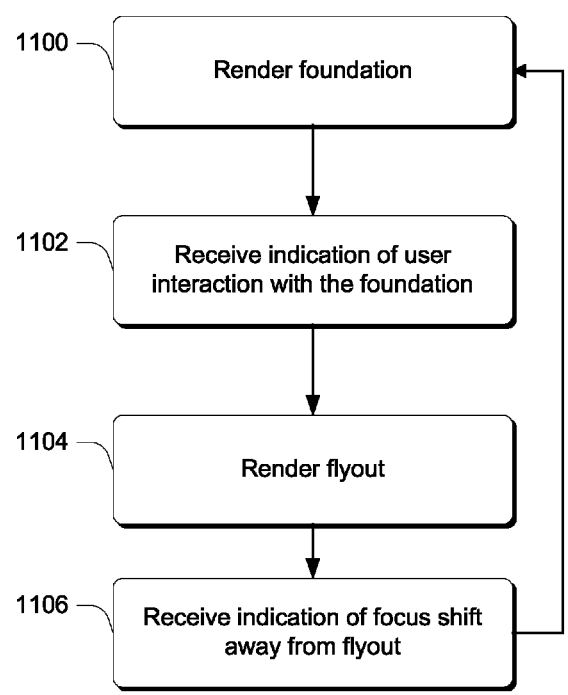
FIG. 11 is a flow diagram that describes steps in a method in accordance with one or more embodiments.

FIG. 11 is a flow diagram that describes steps in a method in accordance with one or more embodiments. Step 1100 renders a foundation. In some embodiments, the foundation includes a visual representation of a cluster. Step 1102 receives an indication of a user interaction with the foundation. Examples of user interaction with a foundation are discussed above and below. Step 1104 renders a flyout. In some embodiments, a flyout can be rendered responsive to receiving the indication of the user interaction with the foundation and/or the flyout can replace the foundation in a display view. Step 1106 receives an indication of a focus shift away from the flyout. For example, a cursor that is hovered over the flyout can be moved away from the flyout. In some embodiments, and responsive to receiving the indication of the focus shift away from the flyout, the method can return to step 1100.

Figure 12:
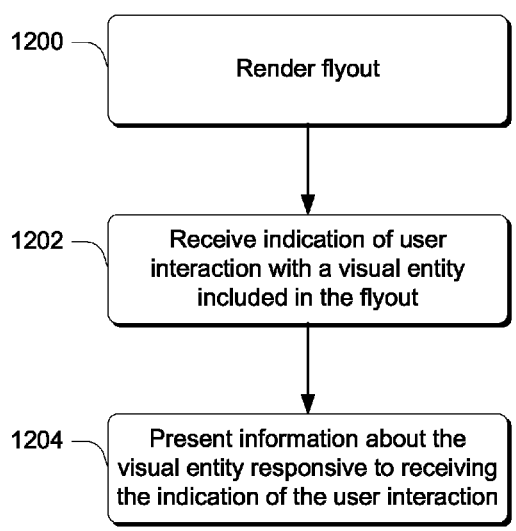
FIG. 12 is a flow diagram that describes steps in a method in accordance with one or more embodiments.

FIG. 12 is a flow diagram that describes steps in a method in accordance with one or more embodiments. In some embodiments, the method can be implemented to present information about a visual entity included in a cluster. Step 1200 renders a flyout. Step 1202 receives an indication of a user interaction with a visual entity included in the flyout. Examples of user interaction are discussed above and below. Step 1204 presents information about the visual entity responsive to receiving the indication of the user interaction.

A number of optional variations and additions to the methods and techniques discussed herein can be implemented to account for various operating scenarios. The following is a non-exclusive list of example optional variations and additions.

(1) The determination of visual entities to include in a cluster can be made using visual entities that are included in a display view during a current render pass.

(2) When a z-order for a visual entity or a cluster changes during a render pass, the z-order in existing clusters simply needs to be updated.

(3) When a change during a render pass simply involves the addition of a visual entity, determine if there is overlap of the added visual entity with existing visual entities.

(4) When a change during a render pass simply involves a zoom operation, re-cluster using existing clusters.

(5) For a particular render pass, simply re-render a cluster (e.g., a foundation) if its entity set has changed.

(6) Locate and remove any duplicate visual entities. For example, if multiple map entries are created for a single business entity, all but one of the entries can be removed from the system.

While certain embodiments are discussed herein with reference to utilizing a flyout to disambiguate clustered entities, this is not intended to be limiting. In some embodiments, a user interaction with a foundation can cause a zoom-in operation that reveals individual entities included in a cluster. For example, when a user interacts with a foundation included as part of a display view, the display view can automatically zoom-in on the area of the foundation such that the visual entities represented by the foundation no longer overlap and are displayed as separate visual entities.

Alternatively or additionally, in some embodiments user interaction with a foundation can cause a list of entities represented by the foundation to be presented. For example, when a user interacts with a foundation included as part of a display view, a list of entities represented by the foundation can be displayed in a window that is included as part of or is adjacent to the display view.

Having described example ways of constructing and interacting with clusters, consider now various embodiments that illustrate example ways of using annotations to indicate overlapping data sets.

Representation of Overlapping Visual Entities

In at least some embodiments, overlapping visual entities can be represented via a combined visual entity. In some example scenarios, overlapping visual entities can be associated with multiple data sets that can be layered to create a display view. For example, as discussed above with respect to a mapping scenario, multiple layers of map data can be overlaid to generate a particular map view. To aid in visualizing multiple layered data sets, annotations for visual entities can be utilized.

Figure 13:
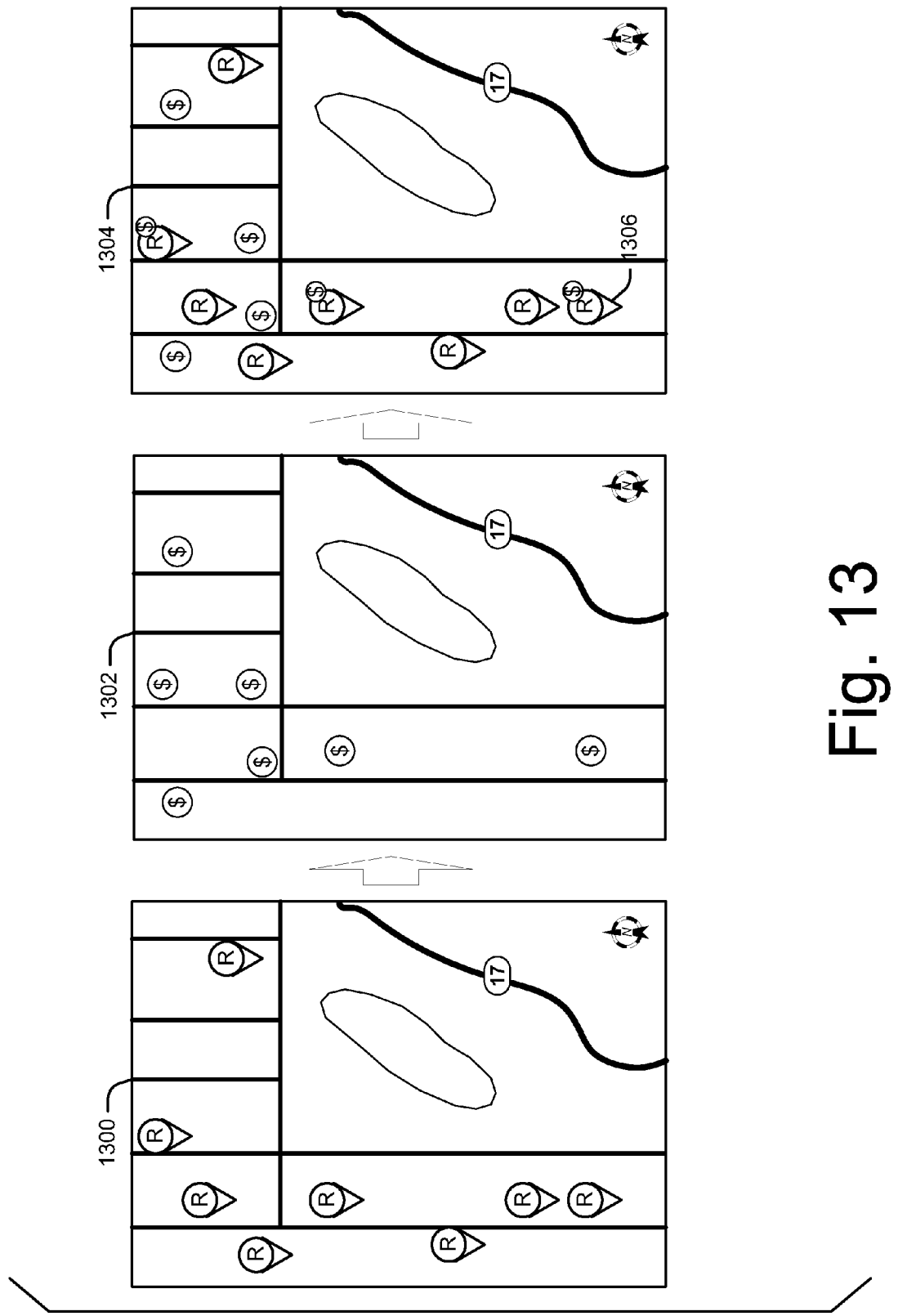
FIG. 13 illustrates how overlapping data sets can be visualized in accordance with one or more embodiments.

FIG. 13 illustrates one example implementation of using annotations to visualize multiple layers of data sets according to some embodiments. A first layer view which includes multiple visual entities is illustrated generally at 1300. In this particular example, first layer view 1300 includes multiple visual entities that represent restaurants in a particular geographical area, as illustrated by the "R" icons. A second layer view is illustrated generally at 1302 and includes multiple visual entities that are different from those illustrated in first layer view 1300. In this particular example, second layer view 1302 includes multiple visual entities that represent business entities that accept a particular payment method (e.g., a particular credit card), as illustrated by the "$" icons. An overlapping layer view is illustrated generally at 1304 and includes visual entities from first layer view 1300 and second layer view 1302, as well as combined visual entities that represent overlap between the layer views. For example, a combined visual entity 1306 represents overlap between first layer view 1300 and second layer view 1302. In some embodiments, combined visual entity 1306 represents a restaurant that accepts the particular payment method indicated by the "$" symbol. In this particular example embodiment, the visual entity that represents a restaurant is annotated with the "$" symbol to indicate overlap between the different layers.

In at least some embodiments, methods discussed above for forming clusters can be utilized to determine when annotations should be used to indicate overlapping data sets. For example, the technique discussed above with respect to FIG. 8 can be utilized to determine that visual entities associated with multiple different data sets overlap. A visual entity can be displayed with annotations to indicate the overlap of the multiple visual entities.

In some embodiments, a combined visual entity can include a foundation. For example, a foundation can be displayed with annotations to visually indicate that multiple visual entities (e.g., in multiple data layers) overlap. Responsive to a user interaction with the annotated foundation, a flyout can be presented that displays the separate visual entities that are represented by the annotated foundation.

Figure 14:
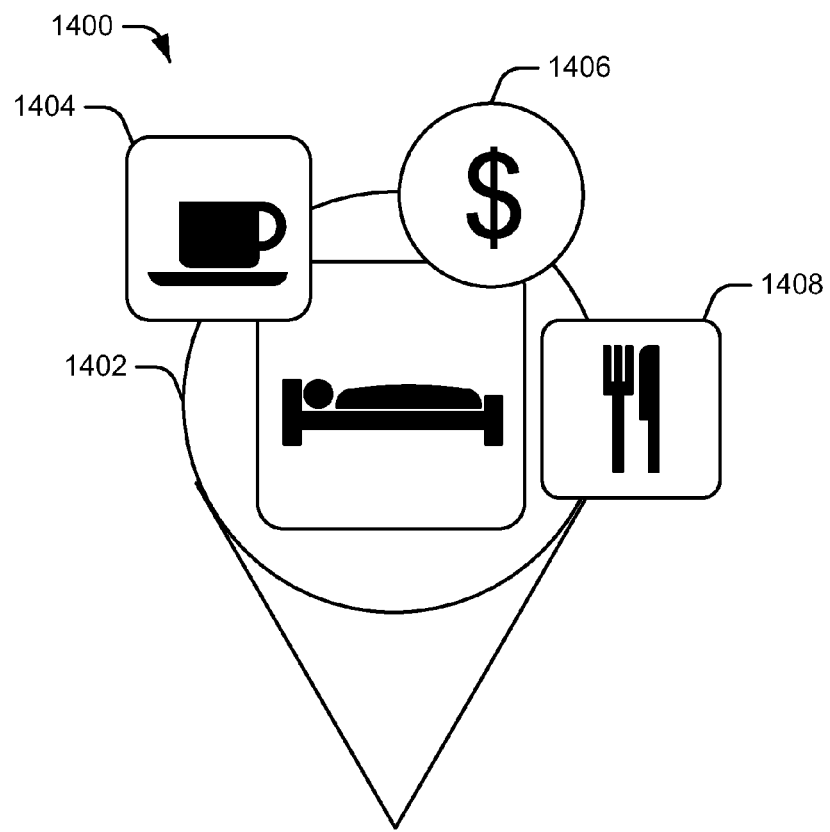
FIG. 14 illustrates an example combined visual entity in accordance with one or more embodiments.

FIG. 14 displays an example combined visual entity in accordance with some embodiments, generally at 1400. Combined visual entity 1400 includes a primary visualization 1402 and annotations 1404, 1406, and 1408. In this particular example embodiment, primary visualization 1402 represents a business entity associated with lodging. The annotations represent other data layers that overlap with the primary visualization 1402. For example, annotation 1404 represent a coffee shop, annotation 1406 represents an entity that accepts a particular payment method, and annotation 1408 represents a dining establishment. Thus, combined visual entity 1400 presents a visual indication of an overlap between these particular data sets.

Alternatively or additionally to the symbol and/or character-based annotation of a combined visually entity, color can also be used as a visual indicator for a combined visual entity. For example, a particular color can be associated with a particular overlap of visual entities and/or data layers and can indicate to a viewer that the combined visual entity represents the particular visual entities.

Figure 15:
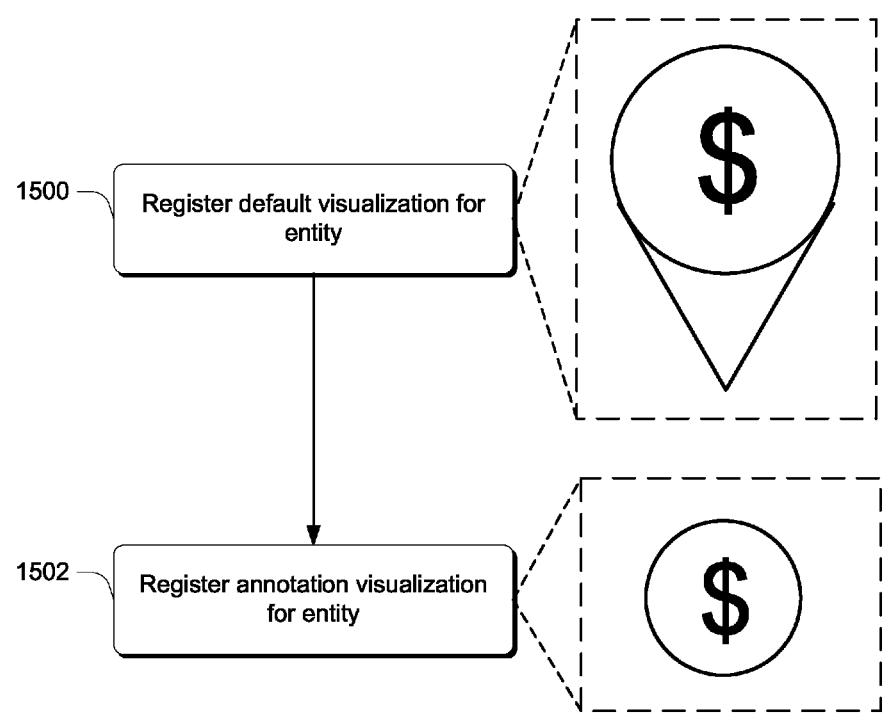
FIG. 15 is a flow diagram that describes steps in a method in accordance with one or more embodiments.

FIG. 15 is a flow diagram that describes steps in a method in accordance with one or more embodiments. In some embodiments, the method can be implemented to register visualizations that can be used to indicate overlapping data sets. Step 1500 registers a default visualization for a visual entity. According to some embodiments, the default visualization can be used when the visual entity is a primary visualization for a particular region of a display view. Step 1502 registers an annotation for the visual entity. In some embodiments, the annotation can be used to annotate a primary visualization for a different visual entity to indicate overlap between the visual entity and the different visual entity.

Figure 16:
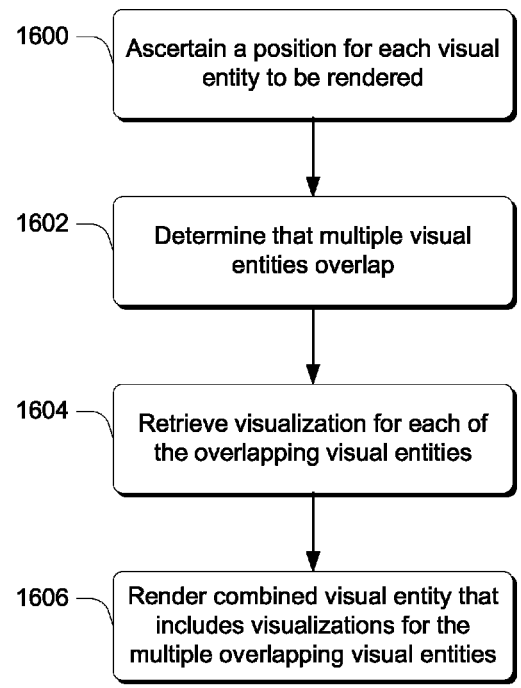
FIG. 16 is a flow diagram that describes steps in a method in accordance with one or more embodiments.

FIG. 16 is a flow diagram that describes steps in a method in accordance with one or more embodiments. As discussed above, in some embodiments visual entities may be associated with different layers of data. Thus, at least in some embodiments the method can be utilized to render a combined visual representation of entities from multiple different data layers. Step 1600 ascertains a position for each visual entity to be rendered. As discussed above, in some embodiments the position can be in terms of a screen position (e.g., an x-coordinate, a y-coordinate, and so on), geographical coordinates, and so on. Step 1602 determines that multiple visual entities overlap. Step 1604 retrieves a visualization for each of the overlapping visual entities. The visualization for each entity can be a primary visualization and/or an annotation. Step 1606 renders a combined visual entity that includes visualizations for the multiple overlapping visual entities. In some embodiments, the combined visual entity can include a primary visualization for one of the overlapping visual entities and one or more annotations for others of the overlapping visual entities.

Figure 17:
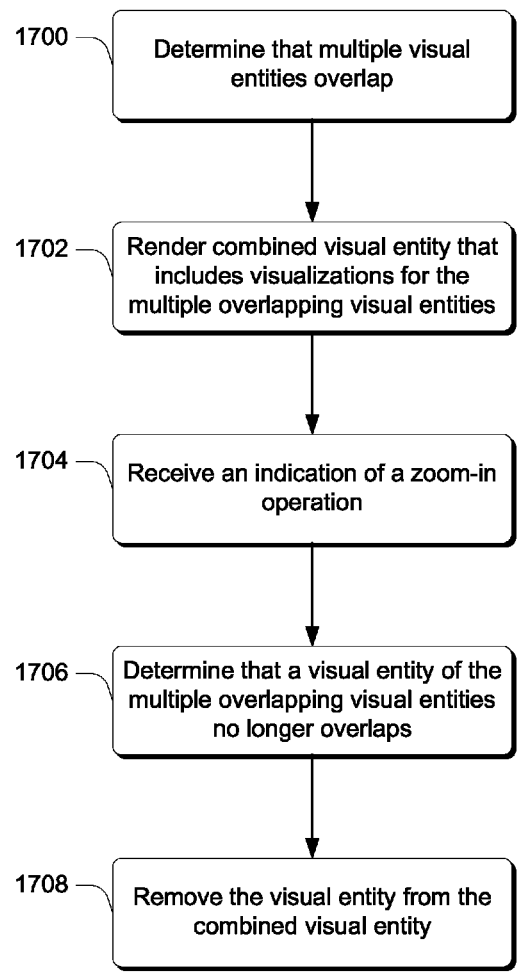
FIG. 17 is a flow diagram that describes steps in a method in accordance with one or more embodiments.

FIG. 17 is a flow diagram that describes steps in a method in accordance with one or more embodiments. Step 1700 determines that multiple visual entities overlap. Step 1702 renders a combined visual entity that includes visualizations for the multiple overlapping visual entities. In some embodiments, the combined visual entity can include a primary visualization and one or more annotations.

Step 1704 receives an indication of a zoom-in operation. In at least some embodiments, the zoom-in operation can occur responsive to user interaction with an application such as a mapping application. Step 1706 determines that a visual entity of the multiple overlapping visual entities no longer overlaps. Step 1708 removes the visual entity from the combined visual entity. In some embodiments, this step can include removing an annotation from the combined visual entity or replacing a primary visualization associated with the combined visual entity.

While several of the example embodiments discussed herein are discussed with respect to a map implementation, it is to be appreciated that methods, techniques, and visualizations discussed herein can be applied in other scenarios without departing from the spirit and scope of the claimed embodiments. For example, clusters can be formed that represent groups of data files, instances of media content, flow charts, schematics, groups of persons at a particular location, and/or other entities to which the methods, techniques, and visualizations discussed herein can be applied.

Example System

Figure 18:
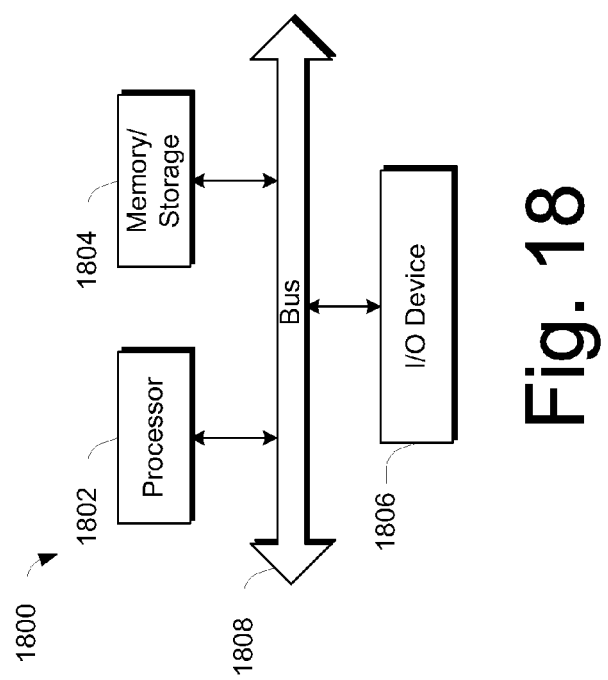
FIG. 18 illustrates an example system that can be used to implement one or more embodiments.

FIG. 18 illustrates an example computing device 1800 that can be used to implement the various embodiments described above. Computing device 1800 can be, for example, computing device 102 of FIG. 1 or any other suitable computing device.

Computing device 1800 includes one or more processors or processing units 1802, one or more memory and/or storage components 1804, one or more input/output (I/O) devices 1806, and a bus 1808 that allows the various components and devices to communicate with one another. Bus 1808 represents one or more of any of several types of bus structures, including a memory bus or memory controller, a peripheral bus, an accelerated graphics port, and a processor or local bus using any of a variety of bus architectures. Bus 1808 can include wired and/or wireless buses.

Memory/storage component 1804 represents one or more computer storage media. Component 1804 can include volatile media (such as random access memory (RAM)) and/or nonvolatile media (such as read only memory (ROM), Flash memory, optical disks, magnetic disks, and so forth). Component 1804 can include fixed media (e.g., RAM, ROM, a fixed hard drive, etc.) as well as removable media (e.g., a Flash memory drive, a removable hard drive, an optical disk, and so forth).

One or more input/output devices 1806 allow a user to enter commands and information to computing device 1800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments enable overlapping visual entities to be grouped into a cluster that can be opened to reveal individual entities that form the cluster. According to one or more embodiments, a cluster is represented on a map or other application display by a visual representation known as a foundation. A user can interact with the foundation to cause the cluster to be opened to reveal a flyout that includes individual entities (e.g., geographic locations) that form the cluster. A user can also interact with an individual entity of the flyout to acquire more information about the individual entity. In at least some embodiments, a foundation can be annotated to indicate one or more entities in a cluster.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. One or more computer readable storage media devices embodying computer readable instructions which, when executed, implement a method comprising:
    rendering a combined visual entity that includes a visualization for each visual entity of multiple overlapping visual entities;
    determining, responsive to receiving an indication of a zoom-in operation, that one of the multiple overlapping visual entities no longer overlaps;
    removing a visualization for the one of the multiple overlapping visual entities from the combined visual entity; and
    replacing a primary visualization associated with the one of the multiple overlapping visual entities and included as part of the combined visual entity, with a different primary visualization associated with another of the multiple overlapping visual entities.

2. The one or more computer readable storage media of claim 1, wherein one or more of the multiple overlapping visual entities represents one or more geographic locations.

3. The one or more computer readable storage media of claim 1, wherein the combined visual entity comprises the primary visualization and one or more annotations.

4. The one or more computer readable storage media of claim 3, wherein the primary visualization corresponds to one of the multiple overlapping visual entities and the one or more annotations correspond to others of the multiple overlapping visual entities.

5. The one or more computer readable storage media of claim 1, wherein the zoom-in operation is responsive to a user interaction with a map view.

6. The one or more computer readable storage media of claim 1, wherein removing the visualization for the one of the multiple overlapping visual entities from the combined visual entity comprises removing an annotation from the combined visual entity.

7. The one or more computer readable storage media of claim 1, wherein the one of the multiple overlapping visual entities can alternately be represented by the primary visualization or an annotation.

8. A computer-implemented method comprising:
    rendering a combined visual entity that includes a visualization for each visual entity of multiple overlapping visual entities;
    determining, responsive to receiving an indication of a zoom-in operation, that one of the multiple overlapping visual entities no longer overlaps;
    removing a visualization for the one of the multiple overlapping visual entities from the combined visual entity; and
    replacing a primary visualization associated with the one of the multiple overlapping visual entities and included as part of the combined visual entity, with a different primary visualization associated with another of the multiple overlapping visual entities.

9. The computer-implemented method of claim 8, wherein one or more of the multiple overlapping visual entities represents one or more geographic locations.

10. The computer-implemented method of claim 8, wherein the combined visual entity comprises the primary visualization and one or more annotations.

11. The computer-implemented method of claim 10, wherein the primary visualization corresponds to one of the multiple overlapping visual entities and the one or more annotations correspond to others of the multiple overlapping visual entities.

12. The computer-implemented method of claim 8, wherein the zoom-in operation is responsive to a user interaction with a map view.

13. The computer-implemented method of claim 8, wherein removing the visualization for the one of the multiple overlapping visual entities from the combined visual entity comprises removing an annotation from the combined visual entity.

14. The computer-implemented method of claim 8, wherein the one of the multiple overlapping visual entities can alternately be represented by the primary visualization or an annotation.

15. A system comprising:
    one or more processors; and
    one or more computer readable storage media devices storing computer-executable instructions that are executable by the one or more processors to cause the system to:
        render a combined visual entity that includes a visualization for each visual entity of multiple overlapping visual entities;
        determine, responsive to receiving an indication of a zoom-in operation, that one of the multiple overlapping visual entities no longer overlaps;
        remove a visualization for the one of the multiple overlapping visual entities from the combined visual entity; and replace a primary visualization associated with the one of the multiple overlapping visual entities and included as part of the combined visual entity, with a different primary visualization associated with another of the multiple overlapping visual entities.

16. The system of claim 15, wherein one or more of the multiple overlapping visual entities represents one or more geographic locations.

17. The system of claim 15, wherein the combined visual entity comprises the primary visualization and one or more annotations.

18. The system of claim 17, wherein the primary visualization corresponds to one of the multiple overlapping visual entities and the one or more annotations correspond to others of the multiple overlapping visual entities.

19. The system of claim 15, wherein the zoom-in operation is responsive to a user interaction with a map view.

20. The system of claim 15, wherein the computer-executable instructions are executable by the one or more processors to cause the system to remove the visualization for the one of the multiple overlapping visual entities from the combined visual entity by removing an annotation from the combined visual entity.

* * * * *